US012580273B2

(12) United States Patent
Lee et al.

(10) Patent No.: US 12,580,273 B2
(45) Date of Patent: Mar. 17, 2026

(54) SEPARATOR FOR SECONDARY BATTERY

(71) Applicant: LG ENERGY SOLUTION, LTD.,
Seoul (KR)

(72) Inventors: Seung Hyun Lee, Daejeon (KR);
Kyung Ryun Ka, Daejeon (KR); **Min
Ji Kim, Daejeon (KR); Hye Won Kim**,
Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 674 days.

(21) Appl. No.: 17/952,547

(22) Filed: Sep. 26, 2022

(65) Prior Publication Data

US 2023/0100278 A1 Mar. 30, 2023

(30) Foreign Application Priority Data

Sep. 27, 2021 (KR) ........................ 10-2021-0127062

(51) Int. Cl.
*H01M 50/451* (2021.01)
*H01M 50/426* (2021.01)
*H01M 50/443* (2021.01)
*H01M 50/446* (2021.01)

(52) U.S. Cl.
CPC ....... *H01M 50/451* (2021.01); *H01M 50/426*
(2021.01); *H01M 50/443* (2021.01); *H01M
50/446* (2021.01)

(58) Field of Classification Search
None
See application file for complete search history.

(56) References Cited

U.S. PATENT DOCUMENTS

| | | | |
|---|---|---|---|
| 2009/0305141 A1 | 12/2009 | Lee et al. | |
| 2012/0328942 A1* | 12/2012 | Thomas-Alyea | H01M 4/587 |
| | | | 429/211 |
| 2013/0319601 A1* | 12/2013 | Li | B32B 27/32 |
| | | | 156/196 |

(Continued)

FOREIGN PATENT DOCUMENTS

| | | |
|---|---|---|
| EP | 2 662 912 A1 | 11/2013 |
| JP | 2013-235824 A | 11/2013 |

(Continued)

OTHER PUBLICATIONS

Density of Polymers, Scientific Polymer Products Inc, WayBack
Machine Archive, Apr. 20, 2021 (Year: 2021).*

(Continued)

*Primary Examiner* — Victoria H Lynch

(74) *Attorney, Agent, or Firm* — Birch, Stewart, Kolasch
& Birch, LLP

(57) ABSTRACT

A separator for a secondary battery including a porous
separator substrate including a polymer; and a coating layer
on at least one surface of the porous separator substrate. The
coating layer includes a crystalline first binder and a non-
crystalline second binder. The crystalline first binder and the
noncrystalline second binder are independently an aqueous
emulsion type binder, thereby ensuring adhesion strength
between the separator and a positive electrode and between
the separator and a negative electrode even in the presence
of an electrolyte solution.

16 Claims, 3 Drawing Sheets

• First binder (crystalline binder)

○ Second binder (non crystalline binder)

Inorganic material

(56)　　　　References Cited

U.S. PATENT DOCUMENTS

| | | | | |
|---|---|---|---|---|
| 2015/0024249 A1* | 1/2015 | Lim | ................... | H01M 50/426 |
| | | | | 29/623.5 |
| 2019/0198837 A1* | 6/2019 | Yushin | ............... | H01M 50/449 |
| 2020/0335814 A1* | 10/2020 | Lin | .................... | H01M 50/497 |
| 2021/0218109 A1 | 7/2021 | Kim et al. | | |
| 2022/0102810 A1* | 3/2022 | Kim | ................... | H01M 50/443 |
| 2022/0200098 A1* | 6/2022 | Honda | ............... | H01M 50/443 |
| 2022/0223976 A1* | 7/2022 | Jeon | ..................... | H01M 50/42 |
| 2022/0311095 A1* | 9/2022 | Choi | .................. | H01M 50/457 |

FOREIGN PATENT DOCUMENTS

| | | | |
|---|---|---|---|
| JP | WO2017/169845 A1 | 10/2017 |
| JP | 2020-155248 A | 9/2020 |
| KR | 10-2013-0126445 A | 11/2013 |
| KR | 10-1341196 B1 | 12/2013 |
| KR | 10-2015-0106810 A | 9/2015 |
| KR | 10-2016-0146580 A | 12/2016 |
| KR | 10-2017-0091149 A | 8/2017 |
| KR | 10-2019-0135262 A | 12/2019 |
| KR | 10-2019-0136822 A | 12/2019 |
| KR | 10-2020-0034470 A | 3/2020 |
| KR | 10-2020-0036648 A | 4/2020 |
| KR | 10-2021-0004217 A | 1/2021 |
| KR | 10-2229626 B1 | 3/2021 |
| KR | 10-2280606 B1 | 7/2021 |
| WO | WO 2020/067778 A1 | 4/2020 |
| WO | WO 2022/240228 A1 | 11/2022 |

OTHER PUBLICATIONS

Xia and Zhang, PVDF-based dielectric polymers and their applications in electronic materials, IET Nanodielectrics, 2018, vo. 1, iss. 1, pp. 17-31. (Year: 2018).*

Extended European Search Report for European Application No. 22196766.4, dated Feb. 21, 2023.

"A Basic Guide to Particle Characterization", Malvern Instruments Worldwide—White Paper, May 2, 2012 (May 2, 2012), pp. 1-26, P055089322.

Brdicka R et al: "Surface area and pore size determination Modern Methods in Heterogeneous Catalysis Research", Handbook of Heterogeneous Catalysis, VCH, Weinheim Handbook of Porous Solids, Nov. 1, 2013 (Nov. 1, 2013), pp. 1-52, XP055903734.

Extended European Search Report, dated Feb. 21, 2023, issued in the corresponding EP Application No. 22 19 6766.

Gagnon: "Understanding Basic Viscosity Measurements—Technical Support Knowledge Base—Confluence", Aug. 25, 2021 (Aug. 25, 2021), pp. 1-4, XP055939833.

Ghosh: Polymer Science Fundamentals of Polymer Science Molecular Weights of Polymers, Sep. 21, 2006 (Sep. 21, 2006), XP055608363.

* cited by examiner

● First binder (crystalline binder)

○ Second binder (non crystalline binder)

▨ Inorganic material

▨ Anode

■ Cathode

▨ Separator

First binder
(crystalline binder)

Second binder
(non crystalline binder)

SEPARATOR FOR SECONDARY BATTERY

RELATED APPLICATION DATA

This non-provisional application claims the benefit under 35 U.S.C. § 119(a) to Patent Application No. 10-2021-0127062, filed in the Republic of Korea on Sep. 27, 2021, which is hereby expressly incorporated by reference in its entirety into the present application.

TECHNICAL FIELD

The present disclosure relates to a separator for a secondary battery. More particularly, the present disclosure relates to a separator for a secondary battery with improved adhesion strength irrespective of the presence or absence of an electrolyte solution in the separator comprising an aqueous emulsion type binder in a separator coating layer.

BACKGROUND ART

Among the components of a secondary battery, a separator comprises a polymer layer having a porous structure, which is interposed between a positive electrode and a negative electrode, to isolate the positive electrode from the negative electrode. The separator plays a role in preventing an electrical short circuit between the two electrodes and allowing electrolyte and ions to pass through. The separator itself does not participate in electrochemical reactions of the battery, but its physical properties, such as wettability in an electrolyte solution, degree of porosity and thermal shrinkage, affect the performance and safety of the battery.

To enhance the physical properties of the separator, a variety of methods for changing the properties of the coating layer by adding a coating layer to a separator substrate and adding a variety of materials to such coating layer have been attempted. For example, inorganic material or particles may be added to the coating layer to improve the mechanical strength of the separator, or inorganic materials or particles, or hydrates may be added to the coating layer to improve the flame retardancy and heat resistance of the separator substrate.

The separator may be adhered to the electrode through a lamination process, and to ensure the adhesion strength between the electrode and the separator, a binder may be added to the coating layer composition of the separator. An example of the lamination technique is shown in FIG. 2, where a cathode and an anode are adhered to both surfaces of the separator.

In general, the crystallinity of the binder may affect the bonding property of the binder to the electrode. For example, a noncrystalline polymer may have better adhesion strength with the electrode in an environment in which there is no electrolyte solution than in an environment in which there is an electrolyte solution. However, since the secondary battery may be manufactured by putting an electrode assembly and an electrolyte solution in a battery case and sealing and then charging and discharging by the movement of lithium ions through the electrolyte solution, there is a need for technology for ensuring the adhesion strength with the electrode in the presence of the electrolyte solution.

In relation to this, Patent Literature 1 discloses an organic/inorganic composite coating porous separator in which a coating solution is coated on a porous substrate, the coating solution in which a polymer compound binder is dispersed, the polymer compound binder comprising a first organic binder and a second organic binder, the first organic binder being an emulsion or a suspension containing a water-insoluble polymer compound dispersed in water and the second organic binder being a water-soluble polymer compound.

The separator of Patent Literature 1 has improved wettability in electrolyte solution, high ionic conductivity and good adhesion strength.

Patent Literature 2 discloses a separator having a coating layer on at least one surface of a porous polymer substrate, wherein the coating layer comprises inorganic particles and a binder polymer, the binder polymer comprises an amorphous adhesive binder polymer and at least one type of fluoride-based copolymer, and the amorphous adhesive binder polymer is included in an amount of 50 parts by weight to 84 parts by weight based on 100 parts by weight of the total binder polymer content.

The separator of Patent Literature 2 has low resistance and improved adhesion strength between the separator and the electrode.

However, Patent Literatures 1 and 2 do not present technology that can improve the adhesion strength between the electrode and the separator not only in the absence of the electrolyte solution, but also in the presence of the electrolyte solution.

PRIOR ART DOCUMENT

Patent Literature (Patent Literature 1) Korean Patent No. 1341196 (2013.12.12)
(Patent Literature 2) Korean Patent Publication No. 2020-0034470 (2020.03.31)

DISCLOSURE

Technical Problem

The present disclosure is designed to solve the above-described problem, and therefore the present disclosure is directed to providing a separator for a secondary battery, the separator comprising a coating layer that provides dry adhesion between an electrode and a separator in a state in which there is no electrolyte, thereby enabling cells to be assembled, and which provides wet adhesion between the electrode and the separator in a state in which the electrolyte is injected into the electrode assembly.

To this end, the present disclosure is directed to designing and providing a coating layer slurry comprising at least one aqueous emulsion type binder and inorganic particles.

Technical Solution

To achieve the above-described object, a separator for a secondary battery according to the present disclosure comprises a porous separator substrate comprising a polymer; and a coating layer on at least one surface of the separator substrate. The coating layer may comprise inorganic particles, a crystalline first binder, and a noncrystalline second binder. The crystalline first binder and the noncrystalline second binder may each independently be an aqueous emulsion type binder. The inorganic particles and the noncrystalline second binder may have a concentration gradient formed over a cross section of the coating layer. In the coating layer, the inorganic particles may be present in a larger amount on a first surface of the coating layer, where the first surface of the coating layer faces the porous separator substrate, than on a second surface of the coating layer, which is a surface opposite to the first surface of the coating layer. When the separator is dry, the noncrystalline second binder may be present in a larger amount on the second surface of the coating layer than on the first surface of the coating layer.

When the separator is wet with an electrolyte solution, the crystalline first binder may have a concentration gradient over a cross section of the coating layer, and the crystalline first binder may be present in a larger amount on the second surface of the coating layer than on the first surface of the coating layer.

A weight ratio of the crystalline first binder to the non-crystalline second binder present in the coating layer may be 1:9 to 9:1.

In the separator for a secondary battery, an adhesion strength of the separator may be 1.0 gf/20 mm or more and 20.0 gf/20 mm or less in a wet state in an electrolyte solution.

In the separator for a secondary battery, an adhesion strength of the separator may be 10 gf/20 mm or more and 20.0 gf/20 mm or less in a dry state.

The crystalline first binder may comprise a polyvinylidene fluoride-containing binder, and the noncrystalline second binder may comprise a polyacrylate-containing binder.

At least one of the crystalline first binder and the noncrystalline second binder may be a copolymer.

The crystalline first binder may have the same polymer backbone as a binder used for a positive electrode, and the noncrystalline second binder may have the same polymer backbone as a binder used for a negative electrode.

The crystalline first binder may be at least one selected from the group consisting of polyvinylidene fluoride (PVDF), polyhexafluoropropylene, polytetrafluoroethylene, polyvinylidene fluoride-hexafluoropropylene (PVDF-HFP), polyvinylidene fluoride-trichloroethylene (PVDF-TCE), and polyvinylidene fluoride-chlorotrifluoroethylene (PVDF-CTFE).

The noncrystalline second binder may be at least one selected from the group consisting of styrene-butadiene rubber, nitrile-butadiene rubber, acrylonitrile-butadiene rubber, acrylonitrile-butadiene-styrene rubber, and acrylate-containing polymer.

The crystalline first binder may be formed from particles having an average particle size (D50) of 200 nm to 350 nm.

The noncrystalline second binder may be formed from particles having an average particle size (D50) of 350 nm to 500 nm.

The density of the inorganic particles may be higher than that of the crystalline first binder and the noncrystalline second binder in the coating layer.

The inorganic particles may have an aspect ratio of 1 to 2, and a BET specific surface area of 5 m$^2$/g to 25 m$^2$/g.

A weight ratio of the first and second binders to the inorganic particles on a first surface of the coating layer, facing the porous separator substrate, may be in a range of from 45:55 to 0:100, and a weight ratio of the first and second binders to the inorganic particles may be in a range of from 50:50 to 100:0 on a second surface of the coating layer, opposite to the porous separator substrate.

The coating layer may be formed by drying a slurry having a solid content of 15% to 30% by weight and a viscosity of 20 cP to 150 cP and comprising inorganic particles, a crystalline first binder, a noncrystalline second binder, and water.

The coating layer may be formed by applying the slurry onto the porous separator substrate and then drying at a temperature in a range of from 45° C. to 65° C.

In the drying, an initial drying temperature may be the highest of a series of drying temperatures.

The present disclosure is directed to providing a secondary battery comprising an electrode assembly comprising a stack of a positive electrode, a negative electrode, and the separator for a secondary battery between the positive electrode and the negative electrode.

The secondary battery may have a bending strength ranging from 9.0 MPa to 26.0 MPa.

The present disclosure also provides a battery module comprising the secondary battery.

Additionally, the present disclosure may provide the above-described problem solving means in a variety of combinations.

Advantageous Effects

As described above, since the separator for a secondary battery according to the present disclosure comprises the crystalline binder and the noncrystalline binder in the coating layer, it is possible to ensure the adhesion strength (dry adhesion strength) between the electrode and the separator by the noncrystalline second binder in an environment in which there is no electrolyte solution and the adhesion strength (wet adhesion strength) between the electrode and the separator by the crystalline first binder in an environment in which there is the electrolyte solution. Since the dry adhesion strength between the electrode and the separator is provided first, the electrode assembly can be manufactured, and since the wet adhesion strength between the electrode and the separator is provided next, the stable adhesion strength between the electrode and the separator can be maintained under a condition in which the electrolyte solution is present.

Accordingly, it is possible to ensure at least a predetermined level of adhesion strength between the electrode and the separator irrespective of the presence or absence of the electrolyte solution.

Additionally, since the binders included in the separator coating layer have similar characteristics to the binders used for the positive electrode and the negative electrode (for instance, the binder included in the separator may have the same backbone as the binders used for the electrodes), the adhesion strength between the positive electrode and the separator and between the negative electrode and the separator may be obtained.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION

Figure 1:
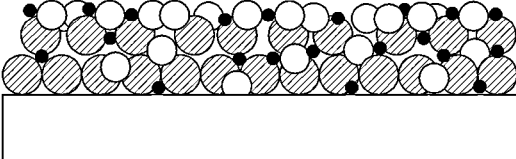
FIG. 1 is an illustration of dry and wet separators in which a separator substrate is provided with a coating layer on either one side of the separator substrate. Each coating layer comprises inorganic particles, a crystalline first binder, and a noncrystalline second binder.
Figure 1:
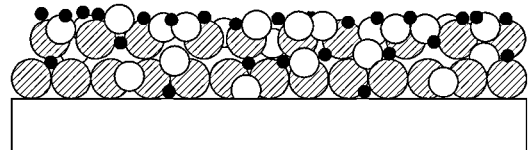
Figure 2:
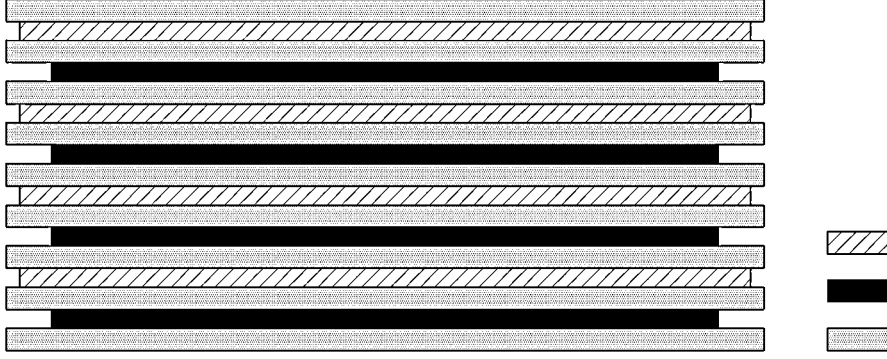
FIG. 2 is an exemplary illustration of an electrode assembly in which a positive electrode and a negative electrode are laminated on respective sides of a separator.

Hereinafter, the present disclosure will be described in sufficient detail with reference to the accompanying drawings for those having ordinary skill in the technical field pertaining to the present disclosure to easily carry out the present disclosure. However, in describing the working principle according to the preferred embodiments of the present disclosure in detail, it is deemed that a detailed description of relevant known functions or elements unnecessarily obscure the subject matter of the present disclosure, the detailed description is omitted.

Additionally, like reference signs denote like functions and elements throughout the drawings. When an element is referred to as being connected to another, the element can be directly connected to the other element and they may be indirectly connected with intervening elements between. Additionally, unless expressly stated to the contrary, the term "comprising" when used in the specification refers to the presence of the stated elements, but does not preclude the addition of one or more other elements.

Additionally, unless otherwise restricted, a detailed description defining or specifying the elements may be applied to all inventions, and is not limited to descriptions of particular inventions.

Additionally, unless explicitly stated otherwise, a singular form includes a plural form throughout the detailed description and the appended claims.

Additionally, unless explicitly stated otherwise, "or" includes "and" throughout the detailed description and the appended claims. Accordingly, "comprising A or B" refers to comprising either A or B or both.

Hereinafter, the present disclosure will be described in more detail.

A separator for a secondary battery according to the present disclosure comprises a separator substrate having a porous structure, wherein the separator substrates includes a polymer, and a coating layer on at least one surface of the separator substrate, wherein the coating layer comprises a crystalline first binder and a noncrystalline second binder, the crystalline first binder and the noncrystalline second binder may each independently be an aqueous emulsion type binder.

In the present invention, the degree of crystallinity can be expressed as a percentage of the melting enthalpy value measured by a differential scanning calorimetry (DSC) measurement with respect to the melting enthalpy value of a theoretically perfect crystal (where crystallinity is a value of 100%). In the present disclosure, the noncrystalline second binder means a binder having a crystallinity degree of 30% or less, and the crystalline first binder may mean a binder having a crystallinity degree of more than 30%.

Since the present disclosure comprises the crystalline first binder and the noncrystalline second binder in the coating layer, it is possible to obtain the adhesion strength with electrode by the crystalline first binder in the presence of the electrolyte solution and the adhesion strength with electrode by the noncrystalline second binder in the absence of the electrolyte solution. However, as explained in more detail below, both binders participate in adhesion strength with the electrode, but to a different degree depending upon the presence or absence of the electrolyte solution.

In general, in the present disclosure, it is preferable that the noncrystalline second binder has higher adhesion strength than the crystalline first binder, and there may be a difference in adhesion strength depending on the temperature and pressure. The temperature and pressure may be temperature and pressure for a lamination process. The temperature may be in the range of 20° C. to 130° C., preferably 40° C. to 100° C., and the pressure may be in the range of 100 kgf/cm² to 2000 kgf/cm². Preferably, the pressure may be in the range of 100 kgf/cm² to 900 kgf/cm², and more preferably 100 kgf/cm² to 500 kgf/cm². When the temperature exceeds 130° C., the binder shape collapses and thus the binder cannot move freely. Therefore, it is difficult to have a sufficient level of adhesion strength. Accordingly, in the coating layer comprising the crystalline first binder and the noncrystalline second binder, the adhesion strength with an electrode may be attributed to the two binders. This may differ in a dry state, where the adhesion strength with an electrode may be primarily formed by the noncrystalline second binder.

During cell assembly, dry adhesion by the noncrystalline second binder may be present between the electrode and the separator, and wet adhesion by the first binder may be present when an electrolyte solution is being injected. Specifically, in a state in which there is no electrolyte solution after the coating layer is dried, the crystalline first binder and the noncrystalline second binder may be randomly distributed on the surface of the porous separator substrate. When the electrode and the separator are bonded in this state, the noncrystalline second binder having a relatively low glass transition temperature and a relatively large surface area may be deformed due to the bonding temperature and pressure, so that the second binder may be primarily present on the surface during bonding, enabling dry adhesion with the electrode.

When the electrolyte solution is injected, the noncrystalline second binder having high solubility and flowability in the electrolyte solution may swell and move into the coating layer or the electrode. For example, when an organic solvent is used, a polymer binder having a large amorphous region swells more than a binder having a higher crystallinity. The flowing occurs due to the swelling of the polymer binder, and the binder may move into the coating layer or the electrode. Accordingly, when this happens, the result will be that the crystalline first binder is primarily present on the surface of the coating layer, and thus, the wet adhesion strength with electrode may be formed primarily by the crystalline first binder in the presence of the electrolyte solution.

In the present invention, the crystalline first binder may have an average particle size (D50) of 200 nm or more, preferably 200 nm to 350 nm, and more preferably 200 nm to 300 nm is used. During the formation of the coating layer, the crystalline first binder satisfying the above range has higher mobility than the other components and is thus distributed on the surface of the coating layer. The crystalline first binder may be more abundantly present on the surface of the coating layer located on the side opposite to the porous separator substrate.

When the separator is in a dry state, the noncrystalline second binder is present in a greater amount on the opposite side of the porous separator substrate than on the surface facing the porous separator substrate in the coating layer. The crystalline first binder is present in a greater amount on the opposite side of the porous separator substrate than on the surface facing the porous separator substrate in the coating layer when the separator is impregnated with the electrolyte solution.

Aside from this, several factors such as particle size, aspect ratio, and density of the inorganic particles, binder density, slurry viscosity, and drying conditions may affect the movement of the binder in the coating layer, and these factors act collaboratively to affect the distribution of the binders. Specifically, the movement of the binders may be significantly affected by the drying conditions of the coating layer.

FIG. 1 is a schematic representation of the separator immediately after coating, and not after electrolyte impregnation. The migration of inorganic substances and the binder may occur depending on the difference in density of raw materials, particle size, solvent ($H_2O$), and drying temperature. The density of the inorganic particles may be in a range of 2 to 4.5 $g/cm^3$, the density of the crystalline first binder may be in a range of 1.1 to 1.5 $g/cm^3$, and the density of the noncrystalline second binder may be in a range of 0.5 to 1.1 $g/cm^3$. The average particle size (D50) of the inorganic particles may be in a range of 500 nm to 5000 nm, and the average particle size (D50) of the crystalline first binder may be in a range of 200 nm or more, preferably in a range of 200 nm to 350 nm. The average particle size of the noncrystalline second binder (D50) may be in a range of 300 nm or larger, preferably in a range of 350 nm to 500 nm.

Separator Substrate

The porous separator substrate electrically isolates the negative electrode from the positive electrode to prevent a short circuit and comprises pores through which lithium ions pass, and the separator may comprise a porous film having high resistance to the electrolyte solution which is an organic solvent and a small pore size. The separator substrate is not limited to a particular type and may comprise commonly used separator materials of secondary batteries, for example, resins such as polyolefins comprising polyethylene, polypropylene and polybutene, polyvinyl chloride, polyethylene terephthalate, polycycloolefin, polyethersulfone, polyamide, polyimide, polyamide imide, polyaramid, nylon, polytetrafluoroethylene and a mixture or copolymer thereof. Among them, the polyolefin-containing resin improves the coating of a coating layer slurry and reduces the thickness of the separator for a secondary battery, resulting in an increased ratio of an electrode active material layer in the battery, thereby increasing the capacity per volume.

The thickness of the separator substrate may be 1 μm to 100 μm, and specifically, 1 μm to 30 μm, and the pore size of the separator substrate may be, in general, 0.01 μm to 10 μm.

A coating layer may be formed on the separator substrate by applying and drying a slurry, to be described later, on the separator substrate. A plasma treatment or surface treatment such as corona discharge may be performed to improve the impregnation with the electrolyte solution before application of the slurry.

Coating Layer

The coating layer may include inorganic particles to improve the mechanical properties and insulating properties of the separator substrate, and at least one binder to improve the adhesion strength between the electrode and the separator. The binder provides adhesion between the electrode and the separator, and binds adjacent inorganic particles and maintains the bonds at the same time. The binder comprises the crystalline first binder and the noncrystalline second binder, and the crystalline first binder and the noncrystalline second binder may each independently be an aqueous emulsion type binder using water as a solvent.

The thickness of the coating layer on one surface of the porous separator substrate is in a range of 0.1 μm to 5 μm, more preferably from 0.1 μm to 3 μm. When the above range is satisfied, the binder may move to the surface of the coating layer, depending on drying conditions to be described later.

Crystalline First Binder and Noncrystalline Second Binder

The crystalline first binder may be a polyvinylidene fluoride-containing binder, and the noncrystalline second binder may be a polyacrylate-containing binder.

Specifically, the crystalline first binder may include at least one selected from the group consisting of polyvinylidene fluoride, polyhexafluoropropylene, polytetrafluoroethylene, polyvinylidene fluoride-hexafluoropropylene (PVDF-HFP), polyvinylidene fluoride-trichloroethylene (PVDF-TCE) and polyvinylidene fluoride-chlorotrifluoroethylene (PVDF-CTFE). More specifically, the crystalline first binder may comprise a copolymer comprising polyvinylidene fluoride.

The crystalline first binder may have an average particle size (D50) of 200 nm or more, preferably 200 nm to 350 nm, and more preferably 200 nm to 300 nm.

The weight average molecular weight of the crystalline first binder may range from 10,000 to 10,000,000. The density of the crystalline first binder may range from 1.1 $g/cm^3$ to 1.5 $g/cm^3$.

The crystalline first binder may have a glass transition temperature of 80° C. to 200° C., more preferably from 80° C. to 150° C., even more preferably from 110° C. to 145° C., and may have high oxidation resistance to an electrolyte solution.

The noncrystalline second binder may be polyacrylate-containing. For instance, the noncrystalline second binder may include at least one selected from the group consisting of a styrene-butadiene rubber, a nitrile-butadiene rubber, an acrylonitrile-butadiene rubber, an acrylonitrile-butadiene-styrene rubber and an acrylate-based polymer, and specifically, an acrylate-containing copolymer.

The noncrystalline second binder may have an average particle size (D50) of 350 nm or more, preferably in a range of 350 nm to 500 nm, more preferably 350 nm to 450 nm. When the average particle size of the noncrystalline second binder exceeds 500 nm, mobility to the boundary between the electrode and the coating layer may be reduced in the absence of an electrolyte solution, such that the adhesion strength between the electrode and the separator is weakened, making it difficult to fabricate an electrode assembly. Moreover, when the coating layer is formed, it is difficult to achieve uniform coating quality. In addition, since the number of binder particles is reduced for the same amount of the binder, the number of contact points between adjacent inorganic substances decreases, resulting in an increase in the likelihood of the inorganic substances being desorbed and reduction in the interstitial volume, which may lead to deterioration in electrical resistance characteristics.

The noncrystalline second binder may have a larger average particle diameter (D50) than the crystalline first binder, and thus has a larger contact area with the electrode than the crystalline first binder, thereby providing better dry adhesion strength.

The weight average molecular weight of the noncrystalline second binder may be in the range of 10,000 to 10,000,000. The density of the noncrystalline second binder may be in the range of 0.5 to 1.1 $g/cm^3$.

The noncrystalline second binder may have a glass transition temperature of 40° C. or higher, preferably in a range of 45° C. to 60° C., even more preferably 48° C. to 60° C. Conventionally, acrylic binder particles having a relatively small particle size of 100 nm to 150 nm were used. In general, the acrylic binder particles comprise diene-based butadiene rubber, thereby having a low glass transition temperature and causing side reactions with the electrolyte solution due to the presence of double bonds, resulting in a problem of gas generation. Therefore, as the noncrystalline second binder, rather than directly using an acrylic binder having a low glass transition temperature of below 0° C. as it is, a copolymer having a high glass transition temperature, which is obtained by copolymerizing acryl and styrene, etc., may be used to prevent side reactions with the electrolyte solution. In addition, within the glass transition temperature range as described above, the noncrystalline second binder maintains its shape without collapsing, even when the first coating layer is dried, thereby exhibiting dry adhesion strength with the electrode.

In a specific example, the crystalline first binder may have similar characteristics to the binder used in the positive electrode, and the second binder may have similar characteristics to the binder used in the negative electrode.

Specifically, the positive electrode may use a polyvinylidene fluoride-containing homopolymer having a high crystallinity of 95% or more, and for example, a homo-PVDF that can be used as the crystalline first binder may be included in a positive electrode material. The negative electrode may comprise an aqueous emulsion type noncrystalline acrylate-containing binder in a negative electrode material.

Since the separator coating layer comprises binders having similar characteristics to the binders used in the positive electrode and the negative electrode, it is possible to improve the adhesion strength between the positive electrode and the separator, and between the negative electrode and the separator. For instance, the same binders may be used in the coating layer and in the corresponding positive and negative electrode, or the binders have the same polymer backbone. As an example, the binder that may be used in the positive electrode or negative electrode may be a homopolymer of PVDF, and the binder used in the separator may be a copolymerized PVDF-HFP binder having 30% HFP substitution.

A weight ratio of the first crystalline binder to the second noncrystalline binder may be 1:9 to 9:1, specifically 3:7 to 7:3.

When the amount of the first crystalline binder is smaller than 10 weight % based on the total weight of the first crystalline binder and the second noncrystalline binder in the coating layer, the dry adhesion strength is good, but the wet adhesion strength is too low. When the amount of the second noncrystalline binder is smaller than 10 weight % based on the total weight of the first crystalline binder and the second noncrystalline binder in the coating layer, the wet adhesion strength is good, but the dry adhesion strength is too low, wherein the dry adhesion strength is the adhesion strength in the absence of the electrolyte solution, and the wet adhesion strength is the adhesion strength in the presence of the electrolyte solution.

Figure 3:
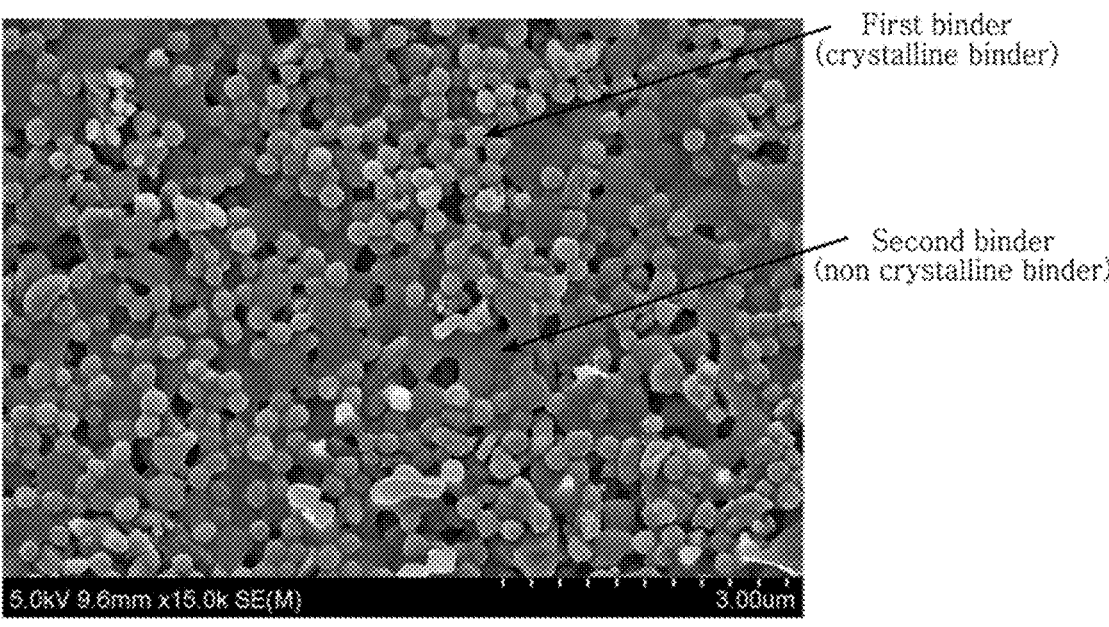
FIG. 3 is an SEM image of a coating layer showing a difference between a crystalline first binder and a noncrystalline second binder.

FIG. 3 provides an SEM image of the coating layer structure from a top-down viewpoint. The image shows the distributions of the first crystalline binder and a second noncrystalline binder in the coating layer.

Inorganic Particles

The inorganic particles are not limited to a particular type and may include any inorganic particles that allow for the uniform thickness of the coating layer and do not cause oxidation and/or reduction reactions in the operating voltage range of the secondary battery applied. In one embodiment, the uniformity of the thickness has a tolerance of +/−2 μm. Especially, inorganic particles capable of transporting an ion may increase the ionic conductivity in an electrochemical device, contributing to the improved performance. Additionally, high dielectric constant inorganic particles may contribute to the increased degree of dissociation of an electrolyte salt, for example, a lithium salt, in a liquid electrolyte, thereby improving the ionic conductivity of the electrolyte solution.

An example of the inorganic particles may comprise inorganic particles having at least one characteristic of lithium ion transport capability, piezoelectricity or flame retardancy.

The inorganic particles having good capability of transporting a lithium ion refer to inorganic particles which contain a lithium atom, but do not store lithium and have a function of moving a lithium ion, and the inorganic particles capable of transporting a lithium ion may transport and move a lithium ion due to the presence of a sort of defect in the particle structure. Accordingly, it is possible to improve the lithium ion conductivity in the battery, thereby contributing to the improved battery performance.

Examples of the inorganic particles capable of transporting a lithium ion may comprise at least one selected from the group consisting of lithium phosphate, lithium titanium phosphate, lithium aluminum titanium phosphate, $(LiAlTiP)_xO_y$ based glass, lithium lanthanum titanate, lithium germanium thiophosphate, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as $LiI$—$Li_2S$—$P_2S_5$, LLZO-containing glass or a mixture thereof, but is not limited thereto.

The inorganic particles having piezoelectricity refers to a material that does not conduct electricity at normal pressure, but when a predetermined pressure is applied, it has electrically conducting properties by a change in the internal structure, and the material exhibits high dielectric constant characteristics having the dielectric constant of 100 or more, and when stretched or compressed by the applied predetermined pressure, generates an electric charge, so that it is positively charged on one side and negatively charged on the opposite side, causing a potential difference between the two sides.

When the inorganic particles having the above-described characteristics are used, in the event of an internal short circuit of the positive electrode and the negative electrode due to external impacts such as local crush and nail, the inorganic particles coated on the separator prevent the direct contact between the positive electrode and the negative electrode, and a potential difference in the particles occurs due to the piezoelectricity of the inorganic particles, causing electrons to move between the positive electrode and the negative electrode, i.e., a flow of small current, thereby contributing to gentle battery voltage drop and consequential improved safety.

Examples of the inorganic particles having piezoelectricity may comprise $BaTiO_3$, $Pb(Zr,Ti)O_3$ (PZT), $Pb_{1-x}La_xZr_{1-y}Ti_yO_3$ (PLZT) ($0<x<1$, $0<y<1$), $Pb(Mg_{1/3}Nb_{2/3})O_3$—$PbTiO_3$ (PMN-PT), hafnia ($HfO_2$) or a mixture thereof, but is not limited thereto.

The inorganic particles having flame retardancy may prevent the overcharge of the secondary battery, impart flame retardant characteristics to the separator or prevent the rapid rise in the internal temperature of the battery. The inorganic particles having flame retardancy are at least one selected from the group consisting of antimony-containing compounds, metal hydroxides or metal hydrates, guanidine-containing compounds, boron-containing compounds and zinc stannate compounds.

Specifically, the antimony-containing compounds are selected from antimony trioxide ($Sb_2O_3$), antimony tetroxide ($Sb_2O_4$) and antimony pentoxide ($Sb_2O_5$); the metal hydroxides or metal hydrates are selected from alumina ($Al_2O_3$), magnesium hydroxide, aluminum hydroxide ($Al(OH)_3$), aluminum oxyhydroxide ($AlO(OH)$) and $CaOAl_2O_36H_2O$; the guanidine-containing compounds are selected from the group consisting of guanidine nitrate, guanidine sulfamate, guanidine phosphate and guanylurea phosphate; and the boron-containing compounds are $H_3BO_3$ or $HBO_2$; the zinc stannate compounds are selected from $Zn_2SnO_4$, $ZnSnO_3$ and $ZnSn(OH)_6$.

The average particle size of the inorganic particles may range from 50 nm and 5000 nm, and preferably between 200 nm and 1,000 nm, and more preferably from 300 nm to 700 nm. If the average particle size of the inorganic particles is smaller than 50 nm, the specific surface area increases and an additional amount of binder is required, which is disadvantageous in the battery resistance. In addition, with the amount of existing binder, the peel strength, or binder detachment, is lowered. If the average particle size of the inorganic particles is larger than 5000 nm, the particles may be blocked and coating uniformity may decrease. In addition, large protruding particles after coating may damage the separator and electrode during lamination and cause a short circuit.

The inorganic particles may have an aspect ratio of 1 to 2, preferably 1.2 to 2. The BET specific surface area of the inorganic particles may be 5 $m^2$/g to 25 $m^2$/g. The binders can easily migrate through the pores between the inorganic particles satisfying the above-mentioned ranges. In particular, as monodisperse, the smaller the aspect ratio, the smaller the BET specific surface area, the better the migration of the binders in the coating layer.

The density of the inorganic particles may be in a range of 2 $g/cm^3$ to 4.5 $g/cm^3$, preferably a range of 2 $g/cm^3$ to 4 $g/cm^3$. The difference in density between the inorganic particles and the first and second binders may be in a range of 0.5 $g/cm^3$ to 4 $g/cm^3$. When the density difference between the inorganic particles and the binder is within the above range, the migration of the binders attributable to the density difference during the formation of the coating layer may be improved.

Dispersing Agent

The coating layer may further comprise a dispersing agent to further improve the dispersion of the inorganic particles. The dispersing agent functions to maintain the uniform dispersion of the inorganic particles in the binder when preparing the coating layer slurry. Examples of materials that can be used as the dispersing agent may comprise at least one selected from oil-soluble polyamines, oil-soluble amine compounds, fatty acids, fatty alcohols, sorbitan fatty acid esters, tannic acids and pyrogallic acids. When included, the dispersing agent may be included in the coating layer in a range from 5 wt % or less.

Solvent

The coating layer may have the crystalline first binder, noncrystalline second binder and inorganic particles mixed with water as the solvent in order to form an aqueous emulsion. After drying the coating layer, the moisture content is about 2000 ppm or less, preferably about 500 ppm or less.

Slurry

The slurry for forming the coating layer by being applied onto the porous separator substrate may include the above-described crystalline first binder, noncrystalline second binder, inorganic particles, and a solvent. The slurry may further comprise additives such as a dispersant.

The slurry may include the inorganic particles and the binder including the first and second binders in a weight ratio (inorganic particles:binder) of 90:10 to 10:90, preferably 80:20 to 20:80. The amount of solids included in the slurry may be 15% to 30% by weight, and the viscosity of the slurry may be 25 to 150 cP. When the above factors are outside the ranges, the migration of the binders in the coating layer is hindered, and thus sufficient adhesion cannot be ensured.

Drying Conditions and Concentration Gradient

The slurry in which the crystalline first binder, the noncrystalline second binder, and the inorganic particles are mixed with an aqueous solvent may be applied on a porous polymer substrate and dried to form a coating layer. The coating layer may have a concentration gradient of the crystalline first binder, the noncrystalline second binder, and the inorganic particles in a thickness direction thereof.

After the slurry is applied onto at least one surface of the porous separator substrate, the slurry may be transferred to a heating zone and dried to form a coating layer. The slurry-coated porous separator substrate may be dried while moving through a heating zone, which is heated to a predetermined temperature at a predetermined speed to form a coating layer-formed separator. The heating temperature of the heating zone may be in a range of 45° C. to 65° C. The porous separator substrate may move through the heating zone at a speed of 25 m/min to 150 m/min, preferably 40 m/min to 60 m/min. The drying conditions of the coating layer may be determined according to the morphological difference between the binder and the inorganic particles, and the drying conditions may determine the concentration gradient of each of the binders and the inorganic particles distributed in the thickness direction of the coating layer.

More specifically, the molecular weight, glass transition temperature, density, and average particle size of the binders in the above-mentioned range; aspect ratio, BET specific surface area, density, and average particle size of the inorganic particles; and the viscosity of the slurry may be adjusted, and the drying temperature in the heating zone, and the movement speed of the coated porous separator substrate moving inside the heating zone may also be adjusted to control the distribution of the binders and the inorganic substances in the coating layer, thereby controlling the concentration gradient in the coating layer.

For example, when the density of the inorganic particles having an aspect ratio of 1 to 2 and a BET specific surface area of 5 to 25 $m^2$/g is 2 $g/cm^3$ to 4.5 $g/cm^3$, the density difference between the inorganic particles and the first and second binders is 0.5 $g/cm^3$ to 4 $g/cm^3$, and the slurry containing the inorganic particles and the first and second binders has a viscosity of 25 to 150 cP after the slurry is applied, the applied slurry passes through a heating zone heated to 45° C. to 65° C. at a speed of 40 m/min, and is dried for 2 minutes to 10 minutes. Specifically, the heating zone may be composed of 5 to 7 individual heating zones that are set to respective heating temperatures in a range of 65° C. (initial heating temperature) to 45° C.

When dried in the heating zone, the initial drying temperature is the highest of the series of drying temperatures in the 5 to 7 heating zones, and thereafter, drying may be performed at a temperature equal to or lower than the initial drying temperature in the subsequent heating zones. Conventionally, the migration of the binders in the coating layer was prevented by gradually increasing the drying temperature or by creating a peak zone (referred to as a "T zone") having a particularly high drying temperature. In the present disclosure, by setting the initial drying temperature to be the highest of the series of drying temperatures, migration of the binders is allowed during the coating layer formation process, so that both dry and wet adhesion can be obtained.

For example, the drying temperature of the initial-stage heating zone may be 65° C., and the drying temperature of the last-stage heating zone may be 45° C. Even though the initial-stage heating zone is 65° C., the shape of the noncrystalline second binder may not be deformed because the noncrystalline second binder included in the actual coating layer is heated to a glass transition temperature of 60° C. or less due to the specific heat of the solvent. The migration of the binder in the coating layer is good under the drying conditions, so that the binder is primarily distributed on a second surface opposite to a first surface facing the porous separator substrate in the formed coating layer, and the inorganic particles may be primarily distributed on the first surface facing the porous separator substrate.

In the coating layer, the content of the inorganic particles increases along a cross section to the first surface facing the porous separator substrate from the second surface opposite to the first surface facing the porous separator substrate. In the coating layer, the content of the binders increase along a cross section from the first surface facing the porous separator substrate to the second surface opposite to the first surface facing the porous separator substrate.

In one embodiment, the weight ratio of the first and second binders to the inorganic particles on the first surface facing the porous separator substrate in the coating layer may be in a range of 45:55 to 0:100, and the weight ratio of the first and second binders to the inorganic particles on the second surface opposite to the first surface may be in a range of 50:50 to 100:0.

Adhesion

In the separator for a secondary battery according to the present disclosure, the wet adhesion strength which is the adhesion strength of the separator in a wet state in the electrolyte solution may be 1.0 gf/20 mm or more, specifically 10 gf/20 mm or more, and more specifically 1 gf/20 mm to 20 gf/20 mm, even more specifically 10 gf/20 mm to 20 gf/20 mm. If the wet adhesion strength is lower than 1 gf/20 mm, the cell stiffness will be lowered, so there is a high probability of problems such as assembly issues or folding of the separator. On the other hand, if the wet adhesion strength is higher than 20 gf/20 mm, lithium dendrites may be precipitated because the separator impregnation with the electrolyte solution is inhibited.

Additionally, in the separator for a secondary battery, the dry adhesion strength which is the adhesion strength of the separator in a dry state may be 10 gf/20 mm or more, specifically 10 gf/20 mm to less than 100 gf/20 mm, and more specifically 30 gf/20 mm to less than 100 gf/20 mm. A high level of dry adhesion may result in electrolyte impregnation problems. If the dry adhesion exceeds 100 gf/20 mm, lithium dendrites may be precipitated because the separator impregnation with the electrolyte solution is inhibited.

Figure 4:
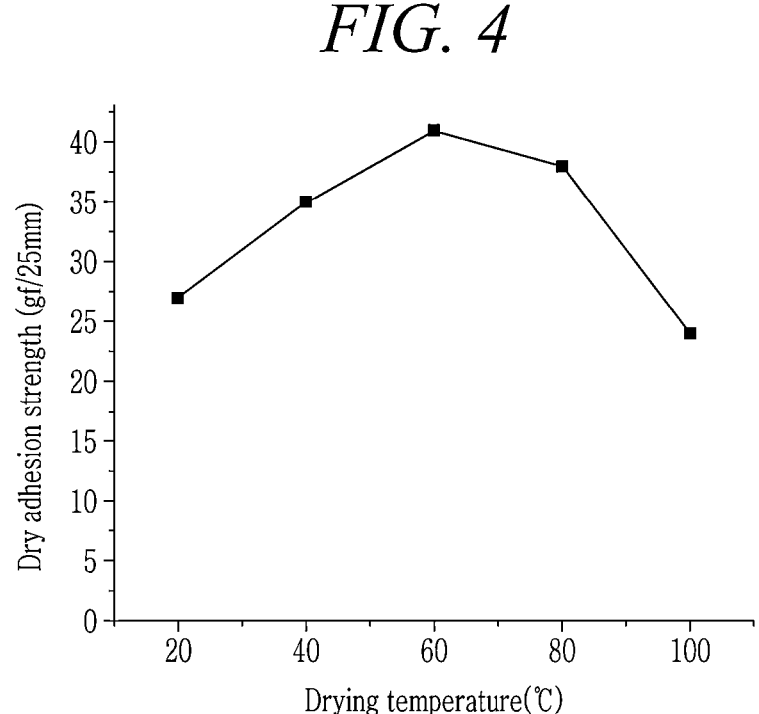
FIG. 4 is a graph that demonstrates the change of the adhesiveness between the electrode and the separator based on the dryness condition.

As shown in the graph of FIG. 4, when the dryness conditions are low, the adhesiveness of the binder is also low due to insufficient migration of the binder. The higher the drying temperature, the binder content on the surface increases, thereby increasing the electrode adhesion. However, above a certain temperature, the first binder becomes "soaked" to decrease the adhesiveness.

Bend Strength

After the cell is manufactured by injecting the electrolyte solution, it is difficult to measure the adhesion strength between the separator and the electrode because the cell needs to be disassembled. After laminating the separator and the electrode, when a peel-off test is performed to measure the adhesion strength between the electrode and the separator, separation between the porous separator substrate and the coating layer may occur instead of separation between the electrode and the separator. Instead of the peel-off test, the wet adhesion strength can be indirectly determined by measuring the bend strength in a state in which the separator and one electrode are laminated.

The bend strength may be determined by measuring the maximum bending stress that the sample receives at the maximum displacement, and the maximum bending stress may increase in proportion to the wet adhesion strength. For example, the maximum bending stress may be the maximum value of the applied stress until the maximum displacement of 20 mm is reached while a force is applied to three points of a laminate of the separator and the electrode. The bending strength of the secondary battery ranges from 1.3 MPa to 26.0 MPa, more preferably from 2.0 MPa to 15.0 MPa.

For example, if the maximum bending stress is 1.3 MPa, the wet adhesion strength may be approximately 1 gf/20 mm, and if the maximum bending stress is 26 MPa, the wet adhesion strength may be approximately 20 gf/20 mm. If the maximum bending stress is less than 1.3 MPa, since the adhesion strength between the electrode and the separator is not secured, it is difficult to make a cell assembly, and folding of the separator may occur. When the maximum bending stress exceeds 26 MPa, since wet adhesion strength is excessively high, it is difficult to impregnate the separator with the electrolyte solution, and lithium dendrites may be precipitated in the corresponding region.

Secondary Battery

The present disclosure includes a secondary battery comprising an electrode assembly comprising a stack of a positive electrode, a negative electrode and the separator for a secondary battery between the positive electrode and the negative electrode, wherein the electrode assembly is received in a battery case and wetted in a non-aqueous electrolyte solution containing a lithium salt injected into the battery case.

Positive Electrode

For example, the positive electrode may be manufactured by coating a positive electrode material comprising a mixture of a positive electrode active material comprising positive electrode active material particles, a conductive material and a binder on a positive electrode current collector, and the positive electrode material may further comprise a filler if necessary.

In general, the positive electrode current collector is manufactured with the thickness of 3 μm to 500 μm, and is not limited to a particular type and may include any material having high conductivity without causing any chemical change to the corresponding battery, for example, one selected from stainless steel, aluminum, nickel, titanium, and aluminum or stainless steel surface treated with carbon, nickel, titanium or silver, and specifically aluminum. The current collector may have microtexture on the surface to improve the adhesion strength of the positive electrode active material, and may come in various types, for example, films, sheets, foils, nets, porous bodies, foams and nonwoven fabrics.

In addition to the positive electrode active material particles, the positive electrode active material may comprise, for example, layered compounds or compounds with one or more transition metal such as lithium nickel oxide ($LiNiO_2$); lithium manganese oxide such as formula $Li_{1+x}Mn_{2-x}O_4$(x is 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O^5$, $Cu_2V_2O_7$; Ni site lithium nickel oxide represented by formula $LiNi_{1-x}MxO_2$ (M=Co, Mn, Al, Cu, Fe, Mg, B or Ga, x=0.01 to 0.3); lithium manganese composite oxide represented by formula $LiMn_{2-x}M_xO_2$ (M=Co, Ni, Fe, Cr, Zn or Ta, x=0.01 to 0.1) or $Li_2Mn_3MO_8$ (M=Fe, Co, Ni, Cu or Zn); $LiMn_2O_4$ with partial substitution of alkali earth metal ion for Li; disulfide compounds; $Fe_2(MoO_4)_3$, but is not limited thereto.

The conductive material is usually added in an amount of 0.1 weight % to 30 weight % based on the total weight of the mixture comprising the positive electrode active material. The conductive material is not limited to any particular type when it has conductive properties while not causing a chemical change to the corresponding battery, and may include, for example, conductive materials, for example, graphite such as natural graphite or artificial graphite; carbon black such as acetylene black, ketjen black, channel black, furnace black, lamp black and thermal black; conductive fibers such as carbon fibers or metal fibers; fluorocarbon, metal powder such as aluminum powder and nickel powder; conductive whiskers such as oxide zinc and potassium titanate; conductive metal oxide such as titanium oxide; and polyphenylene derivatives.

The binder included in the positive electrode assists in binding the active material and the conductive material and binding to the current collector, and is usually added in an amount of 0.1 weight % to 30 weight % based on the total weight of the mixture comprising the positive electrode active material. Examples of the binder may comprise polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer, styrene-butadiene rubber, fluorine rubber and various types of copolymers.

In one embodiment, the binder present in the positive electrode has similar characteristics to the crystalline first binder present in the coating layer. In one embodiment, the same binder(s) are used in the positive electrode as in the first crystalline binder for the coating layer. For example, the crystalline first binder present in the coating layer may be a PVDF copolymer, and the binder present in the positive electrode may be a PVDF homopolymer. Because both the PVDF copolymer and the PVDF homopolymer have a similar backbone polymer structure, the polymers share a similar characteristic.

Negative Electrode

The negative electrode may be manufactured by coating a negative electrode active material on a negative electrode current collector and drying, and the negative electrode active material may further comprise the components included in the positive electrode described above.

In general, the negative electrode current collector is manufactured with the thickness of 3 μm to 500 μm. The negative electrode current collector is not limited to a particular type and may comprise any material having conductive properties without causing any chemical change to the corresponding battery, for example, copper, stainless steel, aluminum, nickel, titanium, sintered carbon, copper or stainless steel surface treated with carbon, nickel, titanium or silver, and aluminum-cadmium alloy. Additionally, in the same manner as the positive electrode current collector, the negative electrode current collector may have microtexture on the surface to improve the adhesion strength of the negative electrode active material, and may come in various types, for example, films, sheets, foils, nets, porous bodies, foams and non-woven fabrics.

For example, the negative electrode active material may comprise carbons such as non-graphitizing carbon and graphite-based carbon; metal composite oxides such as $Li_xFe_2O_3$(0≤x≤1), $Li_xWO_2$(0≤x≤1), $Sn_xMe_{1-x}Me'_yO_z$ (Me: Mn, Fe, Pb, Ge; Me': Al, B, P, Si, Groups 1, 2 and 3 elements of the periodic table, halogen; 0≤x≤1; 1≤y≤3; 1≤z≤8); lithium metals; lithium alloys; silicon-containing alloys; tin-containing alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The negative electrode may include a binder. The binder included in the negative electrode is usually added in an amount of 0.1 weight % to 30 weight % based on the total weight of the mixture comprising the negative electrode active material. In an exemplary embodiment of the present application, the negative electrode binder may comprise at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also comprise various polymers thereof.

In one embodiment, the binder present in the negative electrode has similar characteristics to the noncrystalline second binder present in the coating layer. In one embodiment, the same binders are used in the negative electrode as in the noncrystalline second binder of the coating layer.

Electrolyte

The non-aqueous electrolyte solution containing a lithium salt comprises an electrolyte solution and the lithium salt, and the electrolyte solution comprises a non-aqueous organic solvent, an organic solid electrolyte and an inorganic solid electrolyte.

For example, the non-aqueous organic solvent may comprise aprotic organic solvents such as N-methyl-2-pyrrolidinone, propylene carbonate, ethylene carbonate, butylene carbonate, dimethyl carbonate, diethyl carbonate, gamma butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

For example, the organic solid electrolyte may comprise polyethylene derivatives, polyethylene oxide derivatives, polypropylene oxide derivatives, phosphoric acid ester polymer, polyalginate lysine, polyester sulfide, polyvinyl alcohol, polyvinylidene fluoride, and polymers containing ionic dissociation groups.

For example, the inorganic solid electrolyte may comprise nitrides, halides and sulfates of Li, for example, $Li_3N$, LiI, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

The lithium salt may be a material that is apt to dissolve in the non-aqueous electrolyte, and may comprise, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate and imide.

The present disclosure also provides a battery module and a battery pack comprising the secondary battery as a unit cell, and a device comprising the battery module or the battery pack.

Specific examples of the device may comprise small devices such as computers, mobile phones and power tools, and medium- and large-scale devices such as power tools powered by an electric motor; electric vehicles comprising Electric Vehicles (EVs), Hybrid Electric Vehicles (HEVs) and Plug-in Hybrid Electric Vehicles (PHEVs); electric wheelers comprising E-bikes and E-scooters; electric golf carts; and energy storage systems, but is not limited thereto.

The structure of the battery module, the battery pack and the device is well known in the art, and its detailed description is omitted herein.

Hereinafter, the present disclosure will be described with reference to exemplary embodiments, but this is provided to help understanding of the present disclosure, and the scope of the present disclosure is not limited thereto.

Example 1

As an inorganic substance, alumina (Sumitomo, AES11) having an average particle size (D50) of 500 nm, a density of 4 $g/cm^3$, an aspect ratio of 1.3, and a BET specific surface area of 8 $m^2/g$ was used. As a crystalline first binder, a fluorine-containing aqueous dispersion emulsion (Arkema, Aquatec9530, solid content 30% by weight, glass transition temperature of 110° C. to 145° C.) having an average particle size (D50) of 200 nm and a density of 1.5 $g/cm^3$ was used. As a noncrystalline second binder, an acryl-containing aqueous dispersion emulsion (LGC, SA22, solid content 30% by weight, glass transition temperature of 48° C. to 60° C.) with an average particle size (D50) of 350 nm and a density of 1 $g/cm^3$ was used, and carboxymethyl cellulose (GLchem, SG-L02) was used. A slurry was prepared by mixing these materials in a final weight ratio of 79:18:2:1 in this order, and the viscosity of the slurry was 50 cP (solid content 30% by weight). The weight ratio of the crystalline first binder to the noncrystalline second binder was 9:1.

Polyethylene SV-9 (SEM corp) having a thickness of 9 μm was used as a porous separator substrate, and the slurry for coating a separator was applied to both sides of the polyolefin-containing separator substrate to a thickness of 3 μm on each side, using a bar coater.

The porous separator substrate coated with the slurry for coating a separator was put into seven heating zones, respectively, under the temperature conditions of 65° C., 65° C., 60° C., 55° C., 50° C., 45° C., and 45° C. and moved sequentially through the seven heating zones at a speed of 40 m/min to be dried for a total of 2 minutes to 3 minutes. Thus, a separator having a total thickness of 15 μm was manufactured.

Example 2

A separator is manufactured using the same method as Example 1 except that the weight ratio of the crystalline first binder to the noncrystalline second binder in example 1 is changed from 9:1 to 7:3.

Example 3

A separator is manufactured using the same method as Example 1 except that the weight ratio of the crystalline first binder to the noncrystalline second binder in example 1 is changed from 9:1 to 5:5.

Example 4

A separator is manufactured using the same method as Example 1 except that the weight ratio of the crystalline first binder to the noncrystalline second binder in example 1 is changed from 9:1 to 3:7.

Example 5

A separator is manufactured using the same method as Example 1 except that the weight ratio of the crystalline first binder to the noncrystalline second binder in example 1 is changed from 9:1 to 1:9.

Comparative Example 1

A separator is manufactured using the same method as Example 1 except that the weight ratio of the crystalline first binder to the noncrystalline second binder in example 1 is changed from 9:1 to 10:0.

Comparative Example 2

A separator is manufactured using the same method as Example 1 except that the weight ratio of the crystalline first binder to the noncrystalline second binder in example 1 is changed from 9:1 to 0:10.

Comparative Example 3

A separator is manufactured using the same method as Example 1 except that the average particle size (D50) of the noncrystalline second binder in Example 1 was changed to 1000 nm.

Comparative Example 4

A separator is manufactured using the same method as Example 1 except that the noncrystalline second binder was changed to an acrylate homopolymer having an average particle size (D50) of 350 nm and a glass transition temperature of less than 0° C.

Comparative Example 5

A separator is manufactured using the same method as Example 1 except that the inorganic substance was changed to aluminum hydroxide particles having a density of 2 $g/cm^3$, an aspect ratio of 2.3, and a BET specific surface area of 40 $m^2/g$.

Comparative Example 6

A separator is manufactured using the same method as Example 1 except that the viscosity in Example 1 was changed 10 cP when the slurry for coating a separator was prepared. Here, the amount of CMC influenced the slurry viscosity as the absolute solid content decreased.

Comparative Example 7

A separator is manufactured using the same method as Example 1 except that the series of heating zones in Example 1 was changed to conditions of drying at 80° C. once when the coating layer was formed.

<Experimental Example 1> Air Permeability (Gurley) Measurement

Asahi Seiko Model EG01-55-1MR is used as an air permeability measuring instrument.

The air permeability is calculated by measuring the time taken for 100 cc of air to pass through the separator substrate through a difference in pressure applied to hollow top and bottom tips of the air permeability measuring instrument to which each separator manufactured in Examples 1 to 5 and Comparative Examples 1 to 7 is fixed, and the results are shown in the following Table 1.

<Experimental Example 2> Dry Adhesion Strength Measurement

Each of a negative electrode comprising a carbon-containing negative electrode material coated on a copper foil and each separator manufactured in Examples 1 to 5 and Comparative Examples 1 to 7 is tailored to 25 mm in width and placed in an overlapping manner.

A sample for measuring the electrode adhesion strength is prepared by pressing in the conditions of 60° C., 6.5 MPa, 1 sec using a hot press.

To measure the adhesion strength between the negative electrode and the separator, a 180° peel test is performed in 300 mm/min condition using Instron UTM equipment.

The measured dry adhesion strength is shown in the following Table 1.

<Experimental Example 3> Wet Adhesion Strength Measurement

Each of a positive electrode comprising a positive electrode material coated on an aluminum foil and each separator manufactured in Examples 1 to 5 and Comparative Examples 1 to 7 is tailored to 20 mm in width and put in a pouch and a carbonate-containing electrolyte solution is injected into the pouch.

A sample for measuring the electrode adhesion strength is prepared by pressing the pouch in the conditions of 5 kgf, 70° C., 4 min.

To measure the adhesion strength between the positive electrode and the separator, a 90° peel test is performed in 200 mm/min condition using Instron UTM equipment.

The measured wet adhesion strength is shown in the following Table 1.

<Experimental Example 4> Separator Resistance (Ω) Measurement

Each separator manufactured in Examples 1 to 5 and Comparative Examples 1 to 7 is interposed between SUS to manufacture a coin cell.

An electrolyte solution comprising 1M $LiPF_6$ and a mixture of ethylene carbonate: ethyl methyl carbonate at a volume ratio of 1:2 is injected into the coin cell.

The resistance of the coin cell is measured through electrochemical impedance spectroscopy analysis results in the condition of amplitude of 10 mV and scan range of 0.1 Hz~1 MHz at 25° C. using BioLogic Science Instrument VMP3, and the results are shown in the following Table 1. The preferred range of separator resistance is from 0.2Ω to 1.8Ω.

<Experimental Example 5> Bend Strength Measurement

The separator prepared in Example 1 and one electrode were each processed to have a size of 3 cm×3 cm, and the separator and the electrode were stacked and laminated at 65° C. at a pressure of 3 kgf/cm$^2$ for 8 minutes. Next, 3 g of an electrolyte solution the same as used in experimental example 4 was injected. The laminate was tested by a 3-point bending test at a compression rate of 50 mm/min with a universal testing machine (UTM) to measure the maximum bending stress for a maximum displacement of 20 mm. The results are shown in Table 1 below.

TABLE 1

| | Comparative example 1 | Example 1 | Example 2 | Example 3 | Example 4 | Example 5 | Comparative example 2 |
|---|---|---|---|---|---|---|---|
| Gurley (s/100 cc) | 85 | 90 | 101 | 104 | 103 | 115 | 120 |
| Dry adhesion strength (gf/20 mm) | 3.8 | 20.1 | 27.3 | 30.2 | 31.6 | 80.2 | 100.0 |
| Wet adhesion strength (gf/20 mm) | 22.1 | 18.7 | 13.0 | 17.0 | 5.3 | 1.8 | 0.9 |
| Separator resistance (Ω) | 0.47 | 0.52 | 0.60 | 0.64 | 0.74 | 0.87 | 0.96 |
| Bend strength (MPa) | 6.7 | 8.3 | 11.08 | 13.03 | 4.0 | 2.3 | 1.6 |

| | Comparative example 3 | Comparative example 4 | Comparative example 5 | Comparative example 6 | Comparative example 7 |
|---|---|---|---|---|---|
| Gurley (s/100 cc) | 88 | 661 | 77 | No coating formed | 883 |
| Dry adhesion strength (gf/20 mm) | 29.4 | 8.7 | 15.9 | | 9.1 |

TABLE 1-continued

| | | | | |
|---|---|---|---|---|
| Wet adhesion strength (gf/20 mm) | 0.7 | 17.9 | 0.8 | 18.4 |
| Separator resistance (Ω) | 0.58 | 1.48 | 0.48 | 1.68 |
| Bend strength (MPa) | 1.4 | 8.8 | 1.8 | 7.9 |

Referring to the above Table 1, when comparing the separators manufactured in the examples with the separators manufactured in the comparative examples, the dry adhesion strength is 10 gf/20 mm or more, and the wet adhesion strength is 1.0 gf/20 mm or more. If the dry adhesive force is too strong as in Comparative Example 2, the assembly becomes hard and there is a high possibility of lithium precipitation and resistance increase.

Additionally, as with Example 3, when the crystalline first binder and the noncrystalline second binder are included at an equal ratio, the dry adhesion strength is 40.7 gf/20 mm, and the wet adhesion strength is 17.0 gf/20 mm.

That is, the separator for a secondary battery according to the present disclosure comprises the crystalline first binder and the noncrystalline second binder at a weight ratio satisfying at least one of dry adhesion strength of 30 gf/20 mm or more or wet adhesion strength of 10 gf/20 mm or more, or more preferably within a range of 5 gf/20 mm to 7 gf/20 mm, thereby ensuring not only the adhesion strength in the absence of the electrolyte solution but also the adhesion strength in the presence of the electrolyte solution.

It is obvious to those having ordinary skill in the technical field pertaining to the present disclosure that a variety of variations and modifications may be made within the scope of the present disclosure based on the foregoing description.

What is claimed is:

1. A separator for a secondary battery, comprising:
a porous separator substrate comprising a polymer; and
a coating layer on at least one surface of the porous separator substrate,
wherein the coating layer comprises inorganic particles, a crystalline first binder and a noncrystalline second binder,
wherein a concentration gradient of the inorganic particles, a concentration gradient of the crystalline first binder, and a concentration gradient of the noncrystalline second binder are present along a cross-section of the coating layer,
wherein the inorganic particles and the noncrystalline second binder are present in a larger amount at a first surface of the coating layer, facing the porous separator substrate, than at a second surface of the coating layer, opposite the porous separator substrate, and wherein the crystalline first binder is present in a larger amount at the second surface of the coating layer, opposite the porous separator substrate, than at the first surface of the coating layer, facing the porous separator substrate,
wherein the crystalline first binder comprises a polyvinylidene fluoride-containing binder, and the noncrystalline second binder comprises a polyacrylate containing binder,
wherein a weight ratio of the crystalline first binder to the noncrystalline second binder is 1:9 to 9:1, and
wherein the noncrystalline second binder has an average particle diameter (DSO) greater than that of the crystalline first binder.

2. The separator for the secondary battery according to claim 1, wherein an adhesion strength of the separator is in a range of 1.0 gf/20 mm to 20.0 gf/20 mm in a wet state in an electrolyte solution.

3. The separator for the secondary battery according to claim 1, wherein an adhesion strength of the separator is in a range of 10 gf/20 mm to less than 100 gf/20 mm in a dry state.

4. The separator for the secondary battery according to claim 1, wherein at least one of the crystalline first binder and the noncrystalline second binder is a copolymer.

5. The separator for the secondary battery according to claim 1, wherein the crystalline first binder has a polymer backbone that is the same as a polymer backbone of a binder used in a positive electrode, and the noncrystalline second binder has a polymer backbone that is the same as a polymer backbone of a binder used in a negative electrode.

6. The separator for the secondary battery according to claim 1, wherein the crystalline first binder comprises at least one selected from the group consisting of polyvinylidene fluoride (PVDF), polyvinylidene fluoride-hexafluoropropylene (PVDF-HFP), polyvinylidene fluoride-trichloroethylene (PVDF-TCE), and polyvinylidene fluoride-chlorotrifluoroethylene (PVDF-CTFE).

7. The separator for the secondary battery according to claim 1, wherein the crystalline first binder is formed from particles having an average particle size (D50) ranging from 200 nm to 350 nm.

8. The separator for the secondary battery according to claim 1, wherein the noncrystalline second binder is formed from particles having an average particle size (D50) ranging from 350 nm to 500 nm.

9. The separator for the secondary battery according to claim 1, wherein the inorganic particles have a higher density than each of the crystalline first binder and the noncrystalline second binder.

10. The separator for the secondary battery according to claim 1, wherein the inorganic particles have an aspect ratio of 1 to 2 and a BET specific surface area of 5 m²/g to 25 m²/g.

11. The separator for the secondary battery according to claim 1, wherein on the first surface of the coating layer, facing the porous separator substrate, a weight ratio of the crystalline first binder and noncrystalline second binder to the inorganic particles is in a range of 45:55 to 0:100, and
wherein on a second surface of the coating layer, opposite the porous separator substrate, the weight ratio of the crystalline first binder and noncrystalline second binder to the inorganic particles is in a range of 50:50 to 100:0.

12. The separator for the secondary battery according to claim 1, wherein the coating layer is obtained by drying a slurry comprising inorganic particles, a crystalline first binder, and a noncrystalline second binder and having a solid content of 15% to 30% by weight and a viscosity of 25 cP to 150 cP.

13. The separator for the secondary battery according to claim 12, wherein the coating layer is formed by applying the slurry on the porous separator substrate and drying at temperatures ranging from 45° C. to 65° C.

14. The separator for the secondary battery according to claim 13, wherein the drying is performed using heating zones each having a different temperature, and a drying temperature of an initial heating zone is highest of the heating zones.

15. A secondary battery, comprising:

an electrode assembly, wherein the electrode assembly comprising a positive electrode, a negative electrode, and the separator for a secondary battery according to claim 1 disposed between the positive electrode and the negative electrode.

16. The secondary battery according to claim 15, wherein the secondary battery has a bend strength of 9.0 MPa to 26.0 MPa.

\* \* \* \* \*